(12) United States Patent
Brunsch (10) Patent No.: US 11,623,488 B2
(45) Date of Patent: Apr. 11, 2023

(54) AXLE MOUNTING UNIT (71) Applicant: SAF-HOLLAND GmbH, Bessenbach (DE)

(72) Inventor: Bernd Brunsch, Dreieich (DE)

(73) Assignee: SAF-HOLLAND GmbH, Bessenbach (DE)

(*) Notice: Subject to any disclaimer, the term of this patent is extended or adjusted under 35 U.S.C. 154(b) by 314 days.

(21) Appl. No.: 16/972,327

(22) PCT Filed: Jun. 3, 2019

(86) PCT No.: PCT/EP2019/064320
§ 371 (c)(1),
(2) Date: Dec. 4, 2020

(87) PCT Pub. No.: WO2019/233939
PCT Pub. Date: Dec. 12, 2019

(65) Prior Publication Data
US 2021/0245564 A1 Aug. 12, 2021

(30) Foreign Application Priority Data
Jun. 6, 2018 (DE) .................. 10 2018 113 434.7

(51) Int. Cl.
*B60G 9/00* (2006.01)
*B60G 7/00* (2006.01)

(52) U.S. Cl.
CPC ............. *B60G 9/003* (2013.01); *B60G 7/008* (2013.01); *B60G 2200/31* (2013.01);
(Continued)

(58) Field of Classification Search
CPC .... B60G 9/003; B60G 7/008; B60G 2200/31; B60G 2202/112; B60G 2204/143; B60G 2204/148; B60G 2204/43
See application file for complete search history.

(56) References Cited

U.S. PATENT DOCUMENTS 4,162,090 A * 7/1979 Schwartz .............. B60G 11/113
267/52
9,186,947 B2 * 11/2015 Kopplow ............... B60G 9/003
(Continued)

FOREIGN PATENT DOCUMENTS

DE 1166016 10/1960
DE 19704124 A1 9/1997
(Continued)

OTHER PUBLICATIONS

European Patent Office; International Search Report; dated Sep. 13, 2019.

*Primary Examiner* — Toan C To
(74) *Attorney, Agent, or Firm* — Price Heneveld LLP (57) ABSTRACT An axle mounting unit for commercial vehicles a surrounding element, an end element, at least one fastening element and a securing device, configured for mounting a first chassis part that comprises an axle, with a second chassis part that comprises a control arm, wherein a surrounding element is arranged on the first chassis part, an end element is arranged on the second chassis part, wherein the surrounding element has at least two legs extending in a leg direction, the end element extends between the two legs, the fastening element braces the end element with the surrounding element, the securing device creates a form-fit securing device that limits and/or prevents a displacement of the separated part in the leg direction in a positive-locking manner in the event of mechanical failure.

19 Claims, 4 Drawing Sheets

(52) U.S. Cl.
CPC .. *B60G 2202/112* (2013.01); *B60G 2204/143* (2013.01); *B60G 2204/148* (2013.01); *B60G 2204/4306* (2013.01)

(56) References Cited

U.S. PATENT DOCUMENTS

| | | | |
|---|---|---|---|
| 11,110,765 B2* | 9/2021 | Peck | B60G 9/003 |
| 2003/0080525 A1 | 5/2003 | Gurudutt et al. | |
| 2005/0253351 A1* | 11/2005 | Pan | B60G 11/113 |
| | | | 280/124.116 |
| 2007/0045915 A1* | 3/2007 | Svendsen | F16F 1/26 |
| | | | 267/37.3 |
| 2013/0320644 A1* | 12/2013 | Wilson | F16F 1/26 |
| | | | 280/124.11 |
| 2014/0117639 A1* | 5/2014 | Ramsey | B60G 9/04 |
| | | | 280/124.11 |
| 2014/0308446 A1 | 10/2014 | Emmerich | |

FOREIGN PATENT DOCUMENTS

| | | |
|---|---|---|
| DE | 10110495 A1 | 9/2002 |
| DE | 102016103306 A1 | 8/2017 |
| EP | 0830957 A2 * | 3/1998 |
| EP | 0873892 A2 * | 10/1998 |
| EP | 1088687 A1 | 4/2001 |
| KR | 20060002423 A | 9/2006 |
| WO | 03081058 A1 | 10/2003 |
| WO | 2013167118 A1 | 11/2013 |

* cited by examiner

AXLE MOUNTING UNIT

BACKGROUND OF THE INVENTION

The invention relates to an axle mounting unit and a method of mounting an axle mounting unit.

Axle mounting units are already known in the state of the art and serve to fix an axle to a control arm, in particular a trailing arm. These axle mounting units usually have clamping connections to clamp the axle to the control arm. These clamping connections require a lot of maintenance, as they have to be retightened during operation to achieve a safe connection. In addition, there is a risk that if such a clamping connection is released, especially by cutting parts of the axle mounting unit or by component failure, damage, especially to persons, can occur. This circumstance is due to the fact that a high degree of deformation energy is stored in the axle mounting unit as a result of the clamping, which is released abruptly when the unit is released, so that flying parts can injure maintenance personnel, for example.

It is therefore the task of the present invention to provide an axle mounting unit and a method for mounting an axle mounting unit, which offer a high degree of safety and reduce the maintenance effort.

SUMMARY OF THE INVENTION

In accordance with the present invention, an axle mounting unit, in particular for commercial vehicles, comprises a surrounding element, an end element, at least one fastening element and a securing device, wherein the axle mounting unit is configured to brace a first chassis part, in particular an axle, with a second chassis part, in particular a control arm, the surrounding element being configured to be arranged on the first chassis part, the end element being configured to be arranged on the second chassis part, the surrounding element having at least two legs which each extend in one leg direction, wherein the end member extends between the two legs or is configured to extend between the two legs, whereon the fastening member braces the end member with the surrounding member or is configured to brace the end member with the surrounding member, wherein the securing device is a form-fit securing device and/or is a means of creating a form-fit securing device, the form-fit securing device serving to limit and/or prevent displacement of the separated part in the direction of the leg in a form-fit or a positive locking manner in the event of mechanical failure or the severing of a part of the axle mounting unit, in particular a part of the leg. In other words, the purpose of the axle mounting unit according to the invention is, among other things, to brace a first chassis part with a second chassis part or to fix them relative to each other, in particular by a non-positive and/or positive connection. The first chassis part and/or the second chassis part may, for example, be formed by a shaft, an axle, in particular an axle tube, a control arm, in particular a trailing arm, the first chassis part preferably being the vehicle chassis part to which the wheel of the axle or the shaft is attached. The second chassis part may in particular be a part of the frame or the shaft and/or axle suspension, for example a trailing arm. The surrounding element or embracing element is configured to be located directly or indirectly on the first chassis part. This arrangement of the surrounding element enables in particular that the surrounding element may preferably transmit a force directly to the first chassis part. This force transmission is preferably positive and/or non-positive, for example by enclosing the first chassis part by means of the surrounding element. Similar to the surrounding element, the end element serves to be arranged directly or indirectly on the second chassis part, wherein this arrangement also serves to transmit a force from the end element to the second chassis part. This transmission of force from the end element to the second chassis part may also be positive and/or non-positive. The fixing of the surrounding element and the end element to the first or second chassis part is carried out in such a way that this connection is fixed (not displaceable) by force and/or positive locking in a mounted state. The surrounding element has at least two legs which extend in one leg direction. The leg direction is in particular the direction in which at least one of the legs extends. The direction in which the leg extends is preferably the rotational axis of symmetry of the theoretical/imaginary cylinder enclosing the respective leg. Alternatively or additionally preferred, the direction of the leg may also be formed by the direction of extension in the area of the leg in which the fixing element is to be fixed to the surrounding element. The end element of the axle mounting unit extends between the two legs of the surrounding element, wherein "extending between . . . " may mean in this context that the two legs in particular are connected to each other by the end element and/or that a force may be transmitted directly and/or indirectly from one leg to the other leg through the end element. The end element may be a separate component from the legs, which makes installation particularly easy. Alternatively, the end element may also be formed in one piece with one of the two legs in order to ensure a particularly mechanically resilient connection of the end element to the leg. The fastening element of the axle mounting unit is used to clamp the end element with the surrounding element, in particular with one of the legs. Preferably this is done in such a way that the surrounding element and the end element at least partially enclose the first and the second chassis part, preferably completely. By bracing the end element with the fastening element, it is achieved that the first chassis part is braced with the second chassis part via the axle mounting unit, so that a secure fixing of the first chassis part to the second chassis part is achieved by the axle mounting unit. The fastening element may be formed by a nut, for example. Preferably, the, in particular distal, end sections of the surrounding element, in particular the leg, each have retaining structures, such as a thread, for fixing the fastening element. These retaining structures are preferably none or only part of the leg-side securing device of the axle mounting unit. The securing device of the axle mounting unit may, for example, be a form-fit securing device and/or a means for creating a form-fit or a positive locking. A form-fit securing device or a positive-locking device may, for example, be formed by a bolt extending transversely to the direction of the leg and/or by a projection on the leg. The securing device may alternatively or additionally preferably also be formed by means of a form-fit securing device. These means of creating the form-fit securing device may, for example, be means which serve to cause plastic deformation of part of the axle mounting unit, in particular of the fastening element and/or the surrounding element and/or the end element, in particular during bracing or mounting of the first chassis part on the second chassis part. This may be achieved, for example, by providing grooves which are at least partially filled by plastic deformation of one or more components of the axle mounting unit during bracing or during the mounting process of the axle mounting unit, so that a form-fit or a positive locking is achieved. The form-fit securing device is configured to limit and/or prevent displacement, in particular flying around, of the separated part in a positive-locking manner, at least in the direction of the leg (positive and negative), in the event of mechanical failure, such as overloading of the axle mounting unit or cutting through a part of the axle mounting unit, in particular one of the legs. Limitation in this context means that the form-fit device may allow play of the separated part relative to the rest of the axle assembly unit, in particular to the leg, but this play is limited, so that uncontrolled flying around of the separated parts or the separated part is not possible. Cutting through or severing a part of the axle mounting unit may be, for example, an intentional separation or an unintentional separation, as is the case with mechanical overload. An intentional separation may be necessary, for example, if the axle mounting unit is to be detached. This intentional disconnection may be achieved in particular by using an angle grinder. The securing device is configured to prevent parts from flying around in the event of mechanical failure or cutting of a part of the axle mounting unit, so that a particularly high degree of safety may be provided. In addition, this also reduces the maintenance effort, as external securing devices are no longer required when servicing the axle mounting unit.

Preferably the legs extend on both sides of the first chassis part or are configured to extend on both sides of the first chassis part. This allows a particularly simple and safe fixing of the axle mounting unit or the first chassis part to the second chassis part. In other words, "extending on both sides" may mean that a part of the leg extends on one side of the first chassis part and the other leg extends on the other side of the chassis part, so that the two legs enclose the first chassis part in particular, at least in some areas. Alternatively or additionally preferred the legs extend on both sides of the second chassis part or are configured to extend on both sides of the second chassis part.

It is advisable to use a U-bracket for the surrounding element. This makes it possible to achieve a particularly low-cost axle mounting unit, since the surrounding element may be configured as a U-shaped bracket at a particularly low cost. It is advisable for the legs of the U-bracket or the surrounding element to have a round and/or oval cross-section at least in some areas. This simplifies the assembly of the surrounding element, as injuries caused by sharp edges in particular are avoided.

Preferably, the surrounding element and/or the end element is made of a metal, preferably steel, especially preferably spring steel. This allows a particularly secure fixing of the first chassis part to the second chassis part. In order to prevent corrosion, it may be advisable to apply an anti-corrosion coating to the surrounding member and/or end element, e.g. paint and/or galvanization.

It is advisable for the fastening element to be fixed on the surrounding element, in particular in such a way that the fastening element may only be detached irreversibly from the surrounding element, in particular non-destructively. In this way a particularly secure fixing of the fastening element to the surrounding element may be achieved. In addition, this type of fixing is also particularly cost-effective, as the maintenance effort required for such a connection is particularly low. In this context, "fixed" may mean that the fixing element is stationary fixed to the surrounding element. Fixing may be achieved in particular by plastically deforming at least part of the fixing element, in particular a part which is in contact with the holding structure, during assembly so that fixing is not only non-positive but also positive. This may be achieved advantageously, for example, by using a Huck-Bolt or a lockbolt.

It is advantageous if the end element has at least one lead-through through which one of the legs extends or which is configured so that one of the legs extends through it. In this way a particularly simple connection between the end element and the surrounding element may be achieved. In addition, by enclosing the surrounding element, in particular the leg of the surrounding element, in a form-fit or a positive locking manner a drift, in particular perpendicular to the direction of the leg, is also prevented, so that a particularly secure fixing may be achieved. The lead-through may be configured as a bore, as this allows a particularly cost-effective production of the lead-through.

Preferably, the securing device is part of the surrounding element and/or the end element and/or the fastening element. In this way a particularly space-saving axle mounting unit may be achieved, since the securing device does not have to be configured as a separate component, but is formed by already existing components.

It is advantageous that at least two legs of the surrounding element each have a securing device so that each of the legs may fail or may be cut through mechanically, and yet displacement of the cut-off part is positively limited and/or prevented by the form-fit securing device. It is particularly advantageous if each leg of the surrounding element has a securing device.

In an advantageous embodiment, the securing device comprises a projection, which preferably extends transversely, particularly preferably perpendicularly to the direction of the leg, with the projection extending from one leg. This makes it possible to achieve a particularly cost-effective axle mounting unit, as such a securing device is easy to manufacture. For example, the projection may be configured as a thickening of the leg, which is particularly oval or circular in shape. In this way, a securing device may be easily achieved and in addition, existing systems may also be easily retrofitted with such a surrounding element. This oval or circular shape of the thickening refers to a cross-section of the thickening in a plane perpendicular to the respective direction of the leg. In order to ensure that the thickening on the leg is fixed securely, the thickening may be made in one piece with the leg, or it may be fixed to the leg by positive-locking joining, especially by gluing or welding.

In a preferred further embodiment, the ratio of the average diameter of the leg to the diameter of the projection is in a range of 0.49 to 0.92, preferably in a range of 0.63 to 0.80 and especially preferred in a range of 0.65 to 0.785. The average diameter of the leg may be the average diameter along the direction of the leg. The relevant diameter of the projection is in particular the maximum diameter of the projection. In this context, "diameter" means in particular the diameter of the smallest possible circle which encloses the relevant cross-section. With a ratio of the mean diameter of the leg to the diameter of the projection in the range of 0.49 to 0.92, a particularly easy-to-produce surrounding element is achieved, so that costs may be saved. With a ratio in the range of 0.63 to 0.80, it is possible to achieve a particularly secure hold or limitation of the displacement of the separated part. With a ratio of 0.65 to 0.785 it has been found that a particularly simple assembly of the axle mounting unit may be achieved.

Preferably, the securing device comprises a recess which is configured to plastically deform the fastening element when the end element is braced with the surrounding element, so that the recess forms a form-fit or positive locking with the plastically deformed part of the fastening element. This is a particularly simple and compact way of creating a form-fit securing device. In other words, the creation of the form-fit securing device may be achieved by plastically deforming a part of the fastening element—into a recess of the securing device—in such a way that the plastically deformed part limits and/or prevents a displacement of the separated part of the axle mounting unit, in particular of the leg of the axle mounting unit. This plastic deformation of the fastening element may be facilitated, for example, by making the fastening element of aluminum and/or steel, as these two materials each allow a high degree of plastic deformation.

In a preferred embodiment, the recess is arranged within the at least one lead-through of the end element, whereby the recess is particularly ring-shaped. By providing the recess for the plastic deformation within the lead-through of the end element, a particularly compact axle mounting unit or means of creating a positive locking may be achieved. In addition to this, the recess in the end element also offers the advantage that particularly high mechanical loads, which may be necessary for plastic deformation, may be safely absorbed. By configuring the recess as a ring-shaped recess, it is possible to achieve, among other things, that this recess may be produced by particularly low-cost manufacturing processes, such as turning, so that costs may be saved. In addition to the advantage of low-cost production, a ring-shaped configuration also has the advantage that the plastic deformation of the fastening element may be promoted or facilitated.

It is expedient for the axle mounting unit to comprise a spring pad, the spring pad being arranged between the first chassis part and the second chassis part or being configured to be arranged between the first chassis part and the second chassis part, the spring pad having at least one opening through which a leg extends or which is configured so that a leg extends through the at least one opening. By providing a spring pad in the axle mounting unit, a particularly secure connection of the first chassis part to the second chassis part may be achieved, in particular because a reduction of the locally occurring surface pressure may be achieved. The spring pad may thus be arranged like a kind of washer between the first chassis part and the second chassis part, wherein the respective contact surfaces must be individually adapted to the outer geometry of the first chassis part and/or the second chassis part in order to achieve a reduction of local surface pressure. Preferably, the opening of the spring pad for the passage of the leg is configured in such a way that the securing device may be passed through the opening to ensure a simplified assembly.

The invention further relates to a method of assembling an axle mounting unit, in particular for commercial vehicles, wherein the axle mounting unit comprises a surrounding element, an end element and a fastening element. The method comprises the following steps:
  connecting the surrounding element to the end element,
  arranging of the surrounding element on a first chassis part, especially an axle,
  arranging of the end element on a second chassis part, in particular a control arm,
  clamping of the surrounding element with the end element by means of the fastening element,
  wherein the fastening element is plastically deformed during clamping in such a way that the fastening element is irreversibly fixed to the surrounding element and/or the end element.

The axle mounting unit may have the features already described, so that in particular the surrounding element, the end element and the fastening element of the axle mounting unit may be formed by the surrounding elements, end elements and/or fastening elements already described. The term "irreversibly fixed to the surrounding element" means that the fastening element is fixed to the surrounding element in such a way that it cannot be detached from the fastening element without destruction, but that at least the fastening element and/or the surrounding element must be destroyed in order to detach this connection. For example, an irreversible fixing may be achieved by plastic deformation of the fastening element, for example by deformation using a hydraulic press. In particular, this plastic irreversible fixing is configured in such a way that the fixing element is fixedly connected to the surrounding element and/or the end element so that no relative movement between the relevant elements can take place.

In a preferred embodiment, the axle mounting unit is an axle mounting unit according to one of the types described above.

BRIEF DESCRIPTION OF THE DRAWINGS

Further advantages and features of the present invention result from the following description with reference to the figures. Individual features of the represented embodiments may also be used in other embodiments, unless this has been expressly excluded. The figures showing.

DETAILED DESCRIPTION OF THE PREFERRED EMBODIMENTS

Figure 1:
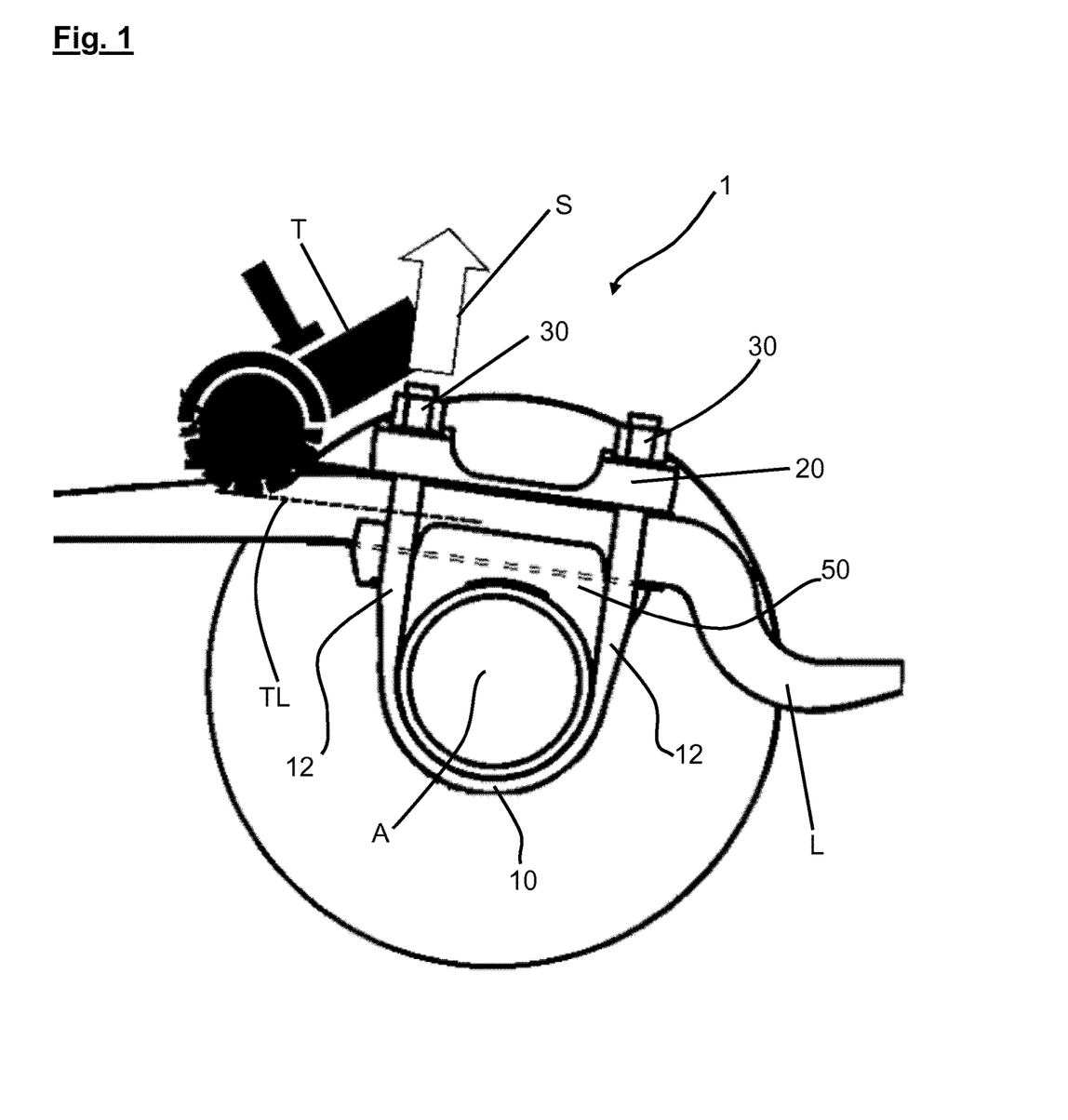
FIG. 1 is a view of an axle mounting unit.

FIG. 1 shows an axle mounting unit 1, which includes a surrounding element 10. An end element 20 is arranged between the legs 12 of the surrounding element 10. The end element 20 is braced with the end element 20 by means of the fastening elements 30 so that the first chassis part A is braced with the second chassis part L. Between the first chassis part A, which in the embodiment shown is formed by an axle tube, and the second chassis part L, which in the embodiment form shown is formed by a trailing arm, an spring pad 50 is arranged so that the locally occurring surface pressure on the first chassis part A and on the second chassis part L is minimized. FIG. 1 shows schematically that the left leg 12, which extends like the right leg 12 in leg direction S, may be separated by a separating tool T along the separating line TL. The mechanical tension in leg 12 can cause the separated part to move or fly away in leg direction S, so that this separated part can cause damage and/or injury to persons. In order to prevent this, the axle mounting unit 1 shown in FIG. 1 has a securing device 40 which is not detectable, to limit and/or prevent this displacement of the cut-off part in the leg direction S.

Figure 2:
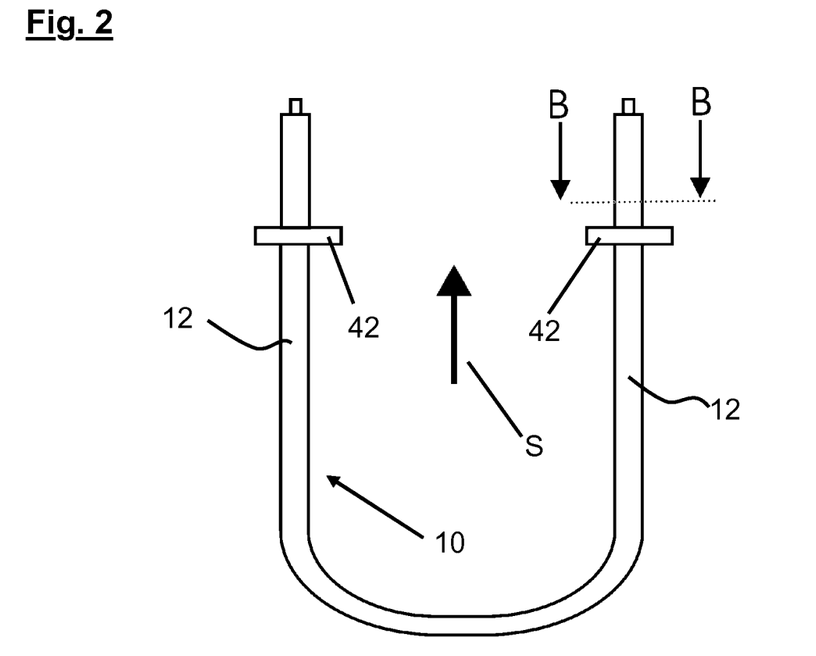
FIG. 2 is a surrounding element.

FIG. 2 shows a surrounding element 10 of an axle mounting unit 1. This surrounding element 10 has two legs 12 which are aligned parallel to each other and extend in leg direction S. Each of these legs 12 has a projection 42 in the upper third (the third facing the free end of the leg), which extends transversely to the leg direction S. This projection 42 forms at least a part of the securing device of the axle mounting unit 1.

Figure 3:
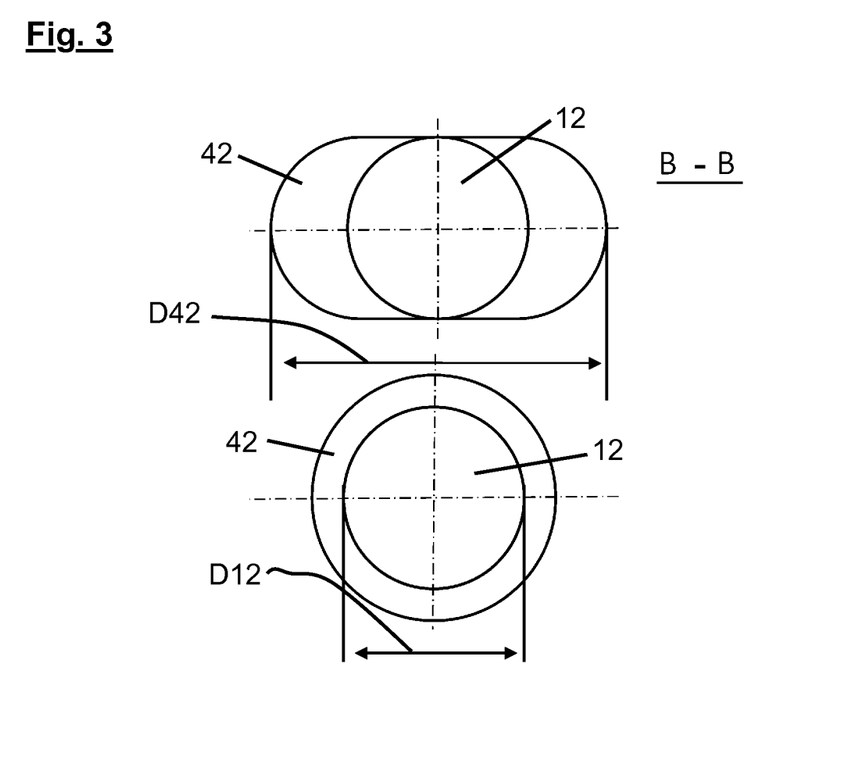
FIG. 3 is a sectional view through one leg of a surrounding element.

FIG. 3 shows two different principal forms of projection 42 from FIG. 2. The location of the section (B-B) shown in FIG. 3 can be seen in principle from FIG. 2. In the upper half of FIG. 3 an oval or elliptical shape of the projection 42 of leg 12 is shown, where the diameter of projection D42 is larger than the diameter D12 of leg 12. In the lower part of FIG. 3 an alternative shape of projection 42 of leg 12 is shown, where projection 42 has a circular cross-section.

Figure 4:
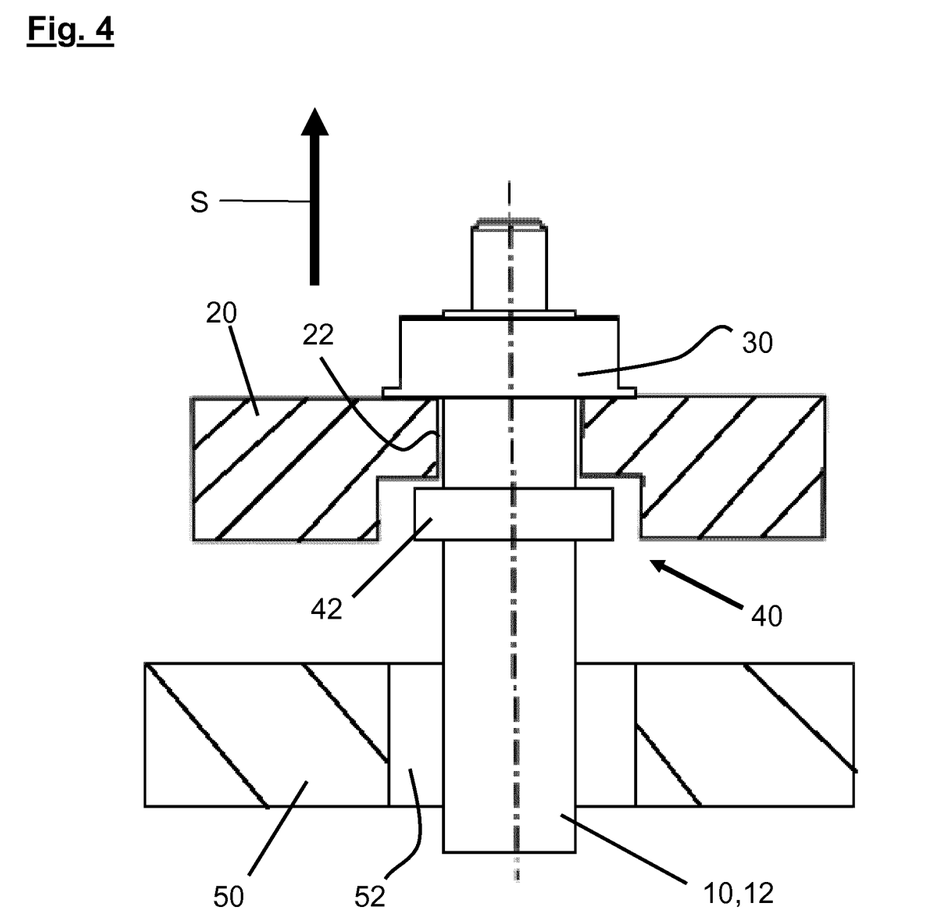
FIG. 4 is a partial view of an axle mounting unit.

FIG. 4 shows a section of an assembled or mounted axle mounting unit 1. The leg 12 of the surrounding element 10 has a projection 42, which in the mounted state shown here has a gap in leg direction S to the end element 20. This leg 12 of the surrounding element 10 is guided through the lead-through 22 of the end element 20. If the leg 12 or the surrounding element 10 is cut through below the projection 42 in leg direction S and/or fails mechanically, the projection 42 limits and/or prevents a displacement of the (above) cut-off part in a form fit or positive-locking manner, so that the projection 42 in combination with the end element 20 forms a securing device 40. In order to be able to clamp the surrounding element 10 and the end element 20 together, the axle mounting unit 1 has at least one fastening element 30. In the embodiment shown in FIG. 4, the leg 12 shown extends through an opening 52 of the spring pad 50, this opening 52 being configured in such a way that it is large enough so that the projection 42 can be guided through the opening 52 to simplify the assembly.

Figure 5:
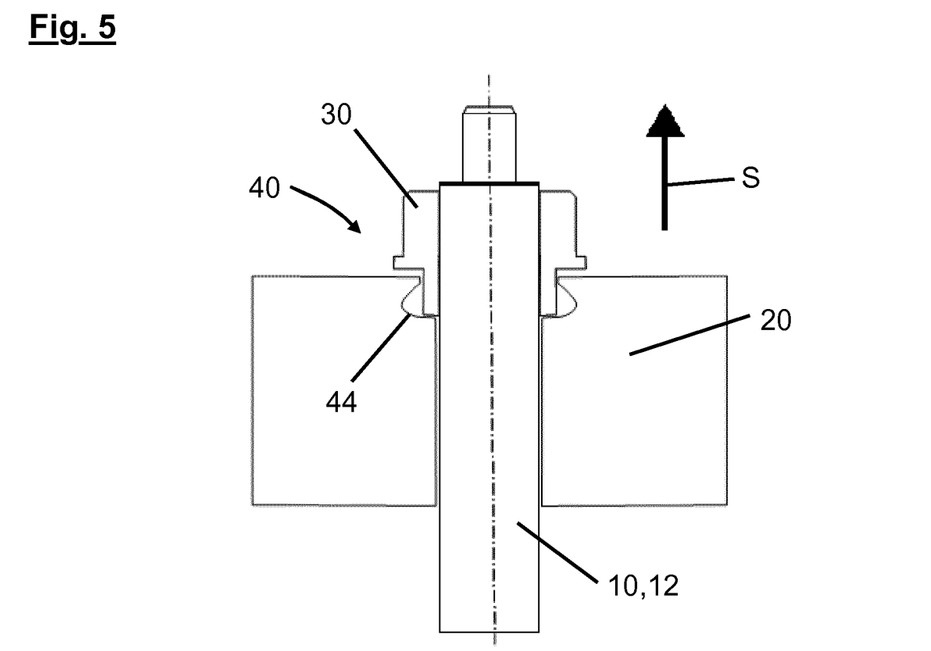
FIGS. 5 and 6 are each a means of creating a form-fit securing device on an axle mounting unit.
Figure 6:
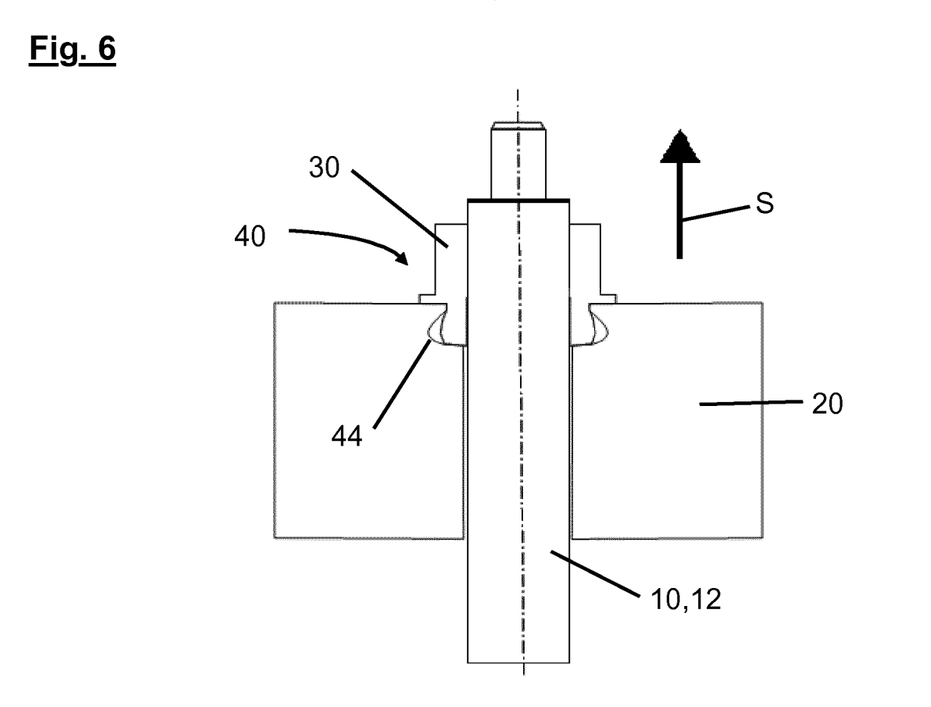

FIG. 5 and FIG. 6 show an exemplary embodiment for a securing device 40, which represents a means of creating a positive locking protection. FIG. 5 shows a situation shortly before the fastening element 30 is braced with the end element 20 or the surrounding element 10. The fastening element 30 has a ring-shaped projection in negative leg direction S, which is configured to be plastically deformed by clamping the fastening element 30 with the end element 20 in such a way that a securing device 40 forms in the ring-shaped recess 44 of the end element 20, as shown in FIG. 6.

REFERENCE SIGNS

1—axle mounting unit
10—surrounding element
12—leg
20—end element
22—lead-through
30—fixing element
40—securing device
42—projection
44—recess
50—spring pad
52—opening
A—first chassis part
D12—diameter of the leg 12
D42—diameter of projection 42
L—second chassis part
S—leg direction
T—cutting tool
TL—dividing line

The invention claimed is:

1. An axle mounting unit for commercial vehicles, comprising:
 a surrounding element;
 an end element;
 at least one fastening element; and
 a securing device;
 wherein the axle mounting unit is configured to clamp a first chassis part that comprises an axle, to a second chassis part that comprises a control arm;
 wherein the surrounding element is configured to be arranged on the first chassis part;
 wherein the end element is configured to be arranged on the second chassis part;
 wherein the surrounding element has at least two legs which each extend in a leg direction;
 wherein the end element is configured to extend between the two legs;
 wherein the fastening element is configured to brace the end element with the surrounding element;
 wherein the end element has at least one lead-through which is configured for one of the legs to extend therethrough;
 wherein the securing device includes a form-fit securing device configured to create a positive locking;
 wherein the form-fit securing device is configured to limit and/or prevent a displacement of a separated part of the leg in the direction of the leg in a positive-locking manner in an event of mechanical failure or the severing of the part of the leg;
 wherein the securing device comprises a recess which is configured to plastically deform the fastening element when the end element is clamped with the surrounding element, so that the recess forms a positive-locking connection with the plastically deformed part of the fastening element;
 wherein the fastening element is fixed on the surrounding element such that the fastening element can only be released destructively from the surrounding element; and
 wherein the recess is arranged within the at least one lead-through of the end element.

2. The axle mounting unit according to claim 1, wherein the legs are configured to extend on both sides of the first chassis part.

3. The axle mounting unit according to claim 2, wherein the surrounding element comprises a U-shaped bracket.

4. The axle mounting unit according to claim 3, wherein the securing device is part of at least one of the surrounding element, the end element, and the fastening element.

5. The axle mounting unit according to claim 4, wherein the securing device comprises a projection which extends perpendicular to the direction of the leg, and wherein the projection extends from one leg.

6. The axle mounting unit according to claim 5, wherein a ratio of a diameter of the leg to a diameter of the projection is in a range from 0.49 to 0.92.

7. The axle mounting unit according to claim 6, wherein the ratio is within a range of from 0.63 to 0.80.

8. The axle mounting unit according to claim 7, wherein the ratio is within a range of from 0.65 to 0.785.

9. The axle mounting unit according to claim 6, wherein the recess is annular.

10. The axle mounting unit according to claim 9, further comprising:
 a spring pad configured to be arranged between the first chassis part and the second chassis part, and wherein the spring pad has at least one opening through which is configured for a leg to extend through the at least one opening.

11. The axle mounting unit according to claim 1, wherein the surrounding element comprises a U-shaped bracket.

12. The axle mounting unit according to claim 1, wherein the securing device is part of at least one of the surrounding element, the end element, and the fastening element.

13. The axle mounting unit according to claim 12, wherein the securing device comprises a projection which extends perpendicular to the direction of the leg, and wherein the projection extends from one leg.

14. The axle mounting unit according to claim 13, wherein the ratio of the mean diameter of the leg to the diameter of the projection is in a range from 0.49 to 0.92.

15. The axle mounting unit according to claim 14, wherein the ratio is within a range of from 0.63 to 0.80.

16. The axle mounting unit according to claim 15, wherein the ratio is within a range of from 0.65 to 0.785.

17. The axle mounting unit according to claim 1, wherein the recess is annular.

18. The axle mounting unit according to claim 1, further comprising:
- a spring pad configured to be arranged between the first chassis part and the second chassis part, and wherein the spring pad has at least one opening through which is configured for a leg to extend through the at least one opening.

19. A method of mounting an axle mounting unit for commercial vehicles, comprising:
- providing a surrounding element;
- providing an end element; and
- providing a fastening element;
- connecting the surrounding element to the end element;
- arranging of the surrounding element on a first chassis part, that comprises an axle;
- arranging the end element on a second chassis part that comprises a control arm; and
- clamping the surrounding element with the end element by the fastening element;
- wherein the fastening element is plastically deformed during clamping such that the fastening element is irreversibly fixed to the surrounding element and/or to the end element; and
- wherein the axle mounting unit includes an axle mounting unit according to claim 1.

* * * * *